United States Patent

Hetzer

[15] 3,661,291

[45] *May 9, 1972

[54] FASTENERS AND CLOSURES

[72] Inventor: Harry Hetzer, Depew, N.Y.
[73] Assignee: GTI Corporation, Meadville, Pa.
[ * ] Notice: The portion of the term of this patent subsequent to May 11, 1988, has been disclaimed.
[22] Filed: Aug. 24, 1970
[21] Appl. No.: 66,223

Related U.S. Application Data

[63] Continuation-in-part of Ser. No. 873,584, Nov. 3, 1969, Pat. No. 3,578,200.

[52] U.S. Cl. ..........................................220/42 B, 138/96 T
[51] Int. Cl. .................B65d 39/04, F16i 57/00, B65d 59/02
[58] Field of Search...............220/42 B, DIG. 19, 24 R, 39 R, 220/42 C, 60 R; 138/96 R, 96 T

[56] References Cited

UNITED STATES PATENTS 3,578,200 5/1971 Hetzer..................................220/42 B
2,657,948 11/1953 Sturtevant.......................220/DIG. 19

Primary Examiner—George E. Lowrance
Attorney—Buell, Blenko & Ziesenheim

[57] ABSTRACT

A fastener and closure is provided for areas surrounding threaded openings comprising a cover member having openings matching said threaded openings, a resilient cylindrical member adapted to slidably fit within said opening and having an interrupted thread on the exterior thereof intermediate the ends engaging the threads in said threaded opening, a circular end cap covering one end of said cylindrical member and extending beyond the periphery forming an annular radial flange, a depending ring at the outer periphery of the flange, spaced from the cylinder and engaging the surface surrounding the port and spacing the flange therefrom when the cylinder is in place in said opening whereby the cylinder is under axial tension between the thread and end cap.

6 Claims, 5 Drawing Figures

PATENTED MAY 9 1972 3,661,291
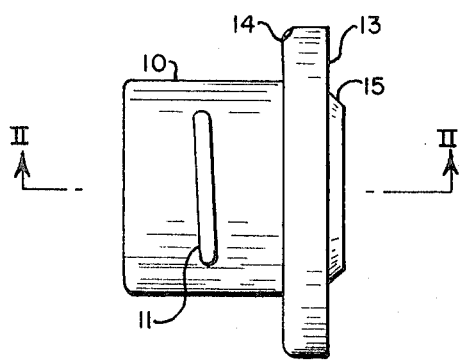
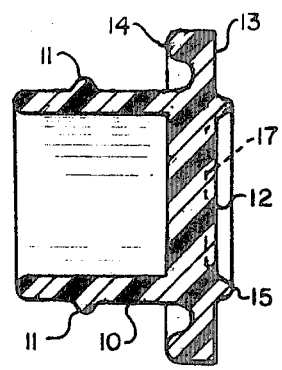
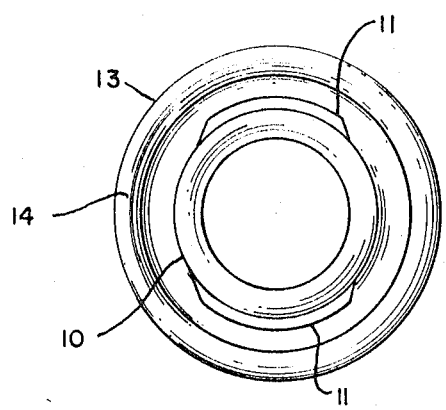
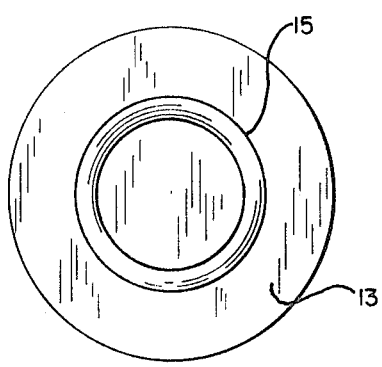
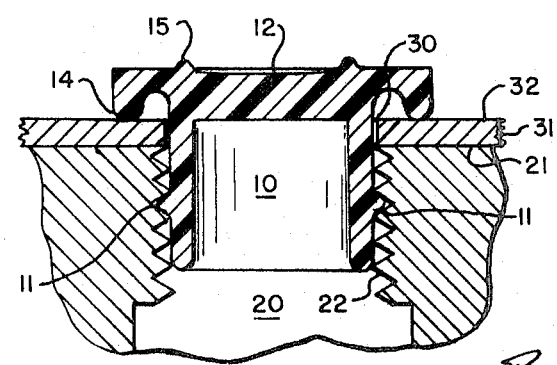
INVENTOR
Harry Hetzer
his attorneys

FASTENERS AND CLOSURES

This application is a continuation-in-part of my copending application Ser. No. 873,584, filed Nov. 3, 1969 now U.S. Pat. No. 3,578,200.

This invention relates to fasteners and closures and particularly to a simple inexpensive fastener and protector or closure for threaded openings such as are found in valve bodies, hydraulic brake cylinders, air brake cylinders and actuators and like apparatus.

The problem of fastening a cover or closure and protecting the threads and entry surface of a threaded port or opening is one of long standing and many different covers and protectors have been heretofore proposed. Covers and protectors made of plastics, metals and the like have been proposed to be held in place with fastening bolts or similar metal threaded fasteners. Generally, these closures are either too difficult to install and remove or are too easily dislodged as well as being less than satisfactory in various other ways.

The present invention provides a fastener and closure combination which is easily installed, will not come off accidentally and yet is quickly removed when desired. It not only protects the threads within the port or opening but also the surfaces surrounding the entrance to the port or opening.

Preferably I provide a cover or closure for internal threads within said opening or corresponding openings in said cover, a machined or otherwise finished surface having openings or ports therein, a resilient cylindrical member adapted to slidably fit within said port, through said openings in the cover, an interrupted thread on the exterior of the cylindrical member engaging the threads of said port, a circular end cap closing one end of said cylindrical member and extending beyond the periphery of the cylindrical member forming an annular flange surrounding the end of said cylinder having a depending annular ring at its outer periphery engaging the cover surface surrounding the opening therein and spacing the flange from said surface. When the cylindrical fastener member is inserted into a port, it is forced inwardly on the end cap so as to provide a cantilever stress on the cylinder so that it is under tension, pulling the interrupted thread into tight engagement with the thread in the port. This stress provides a holding action against the threads which prevents the closure from being removed until the stress is relieved. This in turn firmly holds the cover in place until the fastener cylinder is removed. This is accomplished by piercing the center of the cap which releases the cantilever action and the closure is readily removed. Preferably the cylindrical fastener member is molded in one piece from a resilient plastic such as polyethylene.

The interrupted thread requires very little force to insert the fastener cylinder in the port and no turning or spinning is required. This is a great time saving over threaded bolts and the like of the prior art, which were used to hold cover plates and closure members in position.

The tension of the fasteners when properly inserted provides a seal at the outer edge of the flange at the depending ring which acts as an effective mask against intrusion of paints, solvents, dirt and foreign material either into the port or onto the surface immediately surrounding the port, which may be necessarily clean and free from scratches for use in sealing a fitting in the port or on the surface.

In the foregoing specification I have set out certain objects, purposes and advantages of my invention. Other objects, purposes and advantages will be apparent from a consideration of the following description and the accompanying drawings in which:

FIG. 1 is a side elevation of a cylindrical fastener member according to my invention;

FIG. 2 is a section on the line II—II of FIG. 1;

FIG. 3 is a bottom plan view of the fastener of FIG. 1;

FIG. 4 is a top plan view of the fastener of FIG. 1; and

FIG. 5 is a fragmentary section through a port and surface with a closure installed according to this invention.

Referring to the drawings I have illustrated a fastener member having a cylindrical body 10 of resilient plastic material provided with interrupted threads 11 intermediate its ends. An end cap 12 of resilient plastic is integrally formed with cylinder 10 and extends beyond the cylinder to form an annular flange 13 having a depending ring 14 at its outer extremity. An upstanding ring 15 may be formed on the top surface of the cap and the area within ring 15 may be reduced in thickness as indicated by the dotted line 17.

The fastener member is inserted into a port 20 through opening 30 in closure plate 31 covering surface 21 to be protected by simply forcing the cylinder into the port until ring 14 bears on surface 32 surrounding opening 30 with the interrupted threads 11 engaged within the threads 22 in port 20 and the end cap slightly dished. This places the cylinder 10 under pressure from the dished end cap exerting a cantilever force from ring 14 bearing on closure 31 around opening 30. At this position the fastener member is very difficult to remove. However, if the area within ring 15 is pierced as by a screw-driver, the pressure is relieved and the closure is easily removed. While not necessary, it is possible to make the area within ring 15 of reduced thickness for ease of puncturing.

While I have illustrated and described a presently preferred embodiment of my invention in the foregoing specification, it will be understood that the invention may be otherwise embodied within the scope of the following claims.

I claim:

1. A protective cover for surfaces surrounding internally threaded openings comprising a cover plate having openings corresponding to said threaded openings, a resilient cylindrical member adapted to slidably fit through the cover plate openings and within said threaded openings, an interrupted thread on the exterior of the cylindrical member engaging the threads in said threaded opening, a circular end cap closing one end of said cylindrical member and extending beyond the periphery thereof forming an annular flange, a depending ring at the outer periphery of said flange spaced from the cylinder member and engaging the cover plate surface surrounding the threaded openings and spacing the flange therefrom when the cylinder member is in place in said threaded openings whereby the cylinder member is in axial tension and the cover plate is biased against the surface to be protected.

2. A protective cover as claimed in claim 1 wherein the center portion of said circular end cap is reduced in thickness.

3. A protective cover as claimed in claim 1 wherein the cylindrical member is made of polyethylene.

4. A protective cover as claimed in claim 1 wherein the cylindrical member is formed in one piece of a resilient plastic.

5. A protective cover as claimed in claim 1 wherein the interrupted thread comprises two thread segments substantially 180° apart.

6. A fastener member for attaching one member to another having a threaded opening comprising a resilient cylindrical member adapted to slidably fit within said threaded opening, an interrupted thread on the exterior of said cylindrical member engaging the threads in said threaded opening, a circular end cap closing one end of said cylindrical member and extending beyond the periphery thereof forming an annular flange, a depending ring at the outer periphery of said flange spaced from the cylindrical member and adapted for engaging the said one member for biasing it toward said other member.

* * * * *